United States Patent [19]

Goforth

[11] Patent Number: 4,529,007
[45] Date of Patent: Jul. 16, 1985

[54] QUICK STOP SOLDERING PLUG AND METHOD FOR USING SAME

[76] Inventor: C. Dean Goforth, 940 NE. 61st Ave., Des Moines, Iowa 50313

[21] Appl. No.: 580,830

[22] Filed: Feb. 16, 1984

[51] Int. Cl.³ .............................................. F16L 55/12
[52] U.S. Cl. ........................................ 138/89; 138/97
[58] Field of Search .................... 138/89, 97; 220/233, 220/234; 137/15, 315, 318

[56] References Cited

U.S. PATENT DOCUMENTS

| | | |
|---|---|---|
| 1,747,933 | 2/1930 | Goodman et al. |
| 2,588,188 | 3/1952 | Weisman. |
| 2,763,282 | 9/1956 | Reedy et al. |
| 2,899,983 | 8/1959 | Farris. |
| 3,093,156 | 6/1963 | Nielsen. |
| 3,473,555 | 10/1969 | Martin et al. .................. 138/89 X |
| 3,669,139 | 6/1972 | Gajdos. |
| 3,800,833 | 4/1974 | Young .................................. 138/89 |
| 3,889,714 | 6/1975 | Wilger et al. ..................... 138/89 |
| 4,111,233 | 9/1978 | Takashi ............................... 138/89 |
| 4,127,141 | 11/1978 | Ledonne et al. |
| 4,310,029 | 1/1982 | Dudek ................................. 138/89 |
| 4,393,564 | 7/1983 | Martin ............................. 138/89 X |

*Primary Examiner*—James E. Bryant, III
*Attorney, Agent, or Firm*—Zarley, McKee, Thomte, Voorhees & Sease

[57] ABSTRACT

The quick stop soldering valve of the present invention is used for closing off an elongated pipe having an open end and an interior cylindrical pipe wall. The valve includes an elongated rod having a compressible plug mounted on one end thereof. A sleeve fits over the other end of the rod and engages the compressible plug. By pulling the rod longitudinally through the sleeve it is possible to compress the plug axially and as a result cause the plug to expand radially outwardly. When the plug is inserted within the pipe, and is expanded radially outwardly, it forms a sealing engagement with the interior surface of the pipe wall.

10 Claims, 4 Drawing Figures

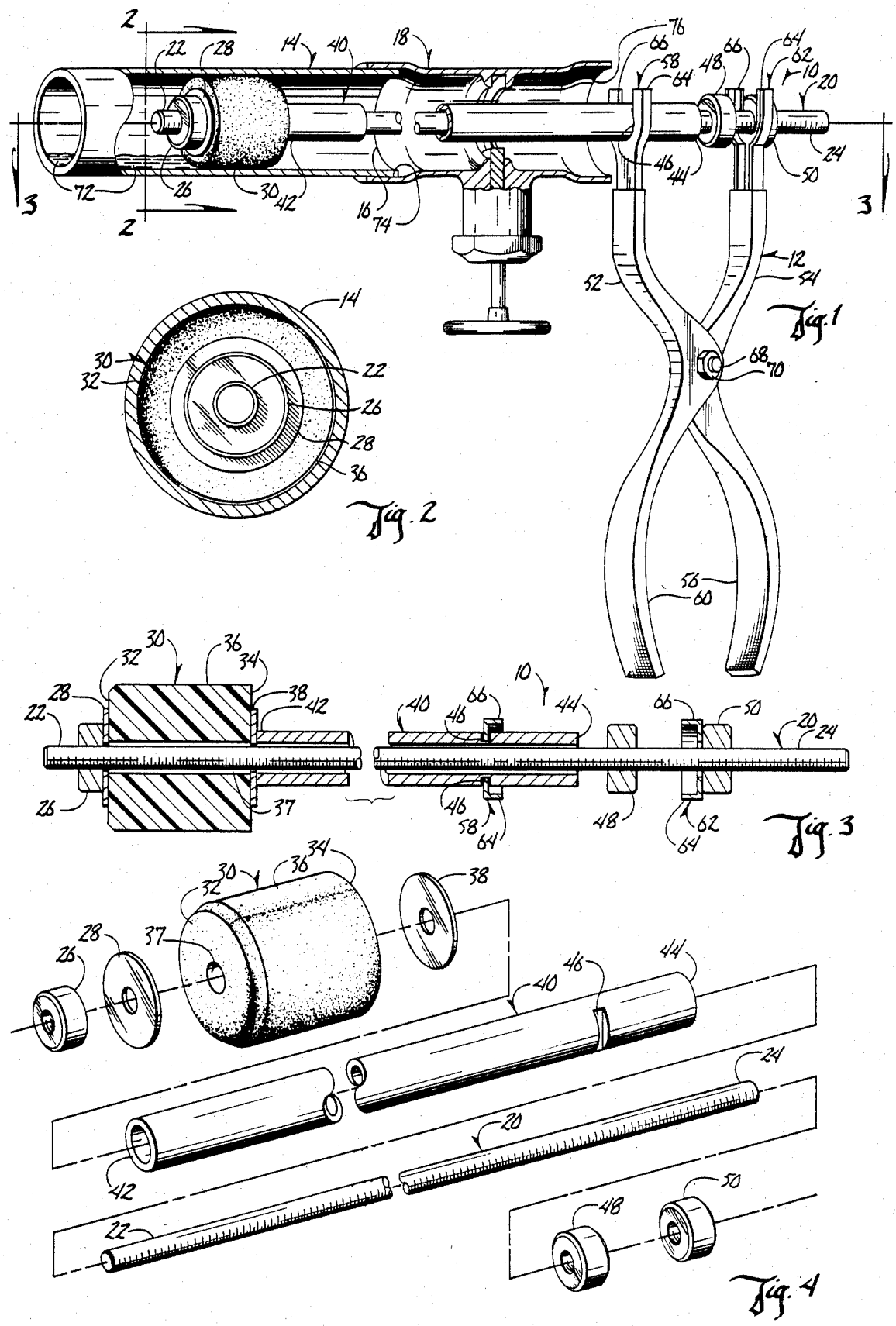

QUICK STOP SOLDERING PLUG AND METHOD FOR USING SAME

BACKGROUND OF THE INVENTION

This invention relates to a quick stop soldering valve for closing off an elongated pipe having an open end and an interior cylindrical pipe wall. The invention also relates to the method for using the soldering valve.

When soldering various sections of copper pipe together it is essential that the copper pipes be completely dry before the soldering begins. If the pipe is wet then it is nearly impossible to obtain a watertight solder joint.

When working with existing plumbing systems, the standard practice is to shut off the water system prior to commencing the soldering. However, water within the system often does not drain out easily. The result is that water continues dripping from the pipe long after the water system has been shut off. The dripping of water prevents the plumber from working with a dry pipe in order to obtain a watertight solder joint.

Therefore, a primary object of the present invention is the provision of an improved quick stop soldering valve which will close off the pipe and prevent dripping during the soldering process.

A further object of the present invention is the provision of a valve which will permit the plugging of the pipe at a point remote from the place where the solder joint is to be applied.

A further object of the present invention is the provision of a soldering valve which can be in an operative position during the time that the soldering is being accomplished, and which also can be removed after the solder joint has been completed.

A further object of the present invention is the provision of a valve for closing off a water pipe during the soldering process wherein the tool can continue to seal off the water pipe at the same time that the solder joint is being made.

A further object of the present invention is the provision of an improved soldering valve which can accommodate sealing plugs of different sizes for different sizes of water pipes.

A further object of the present invention is the provision of a soldering valve which can be manipulated by means of a small tool for causing the valve to be moved to its sealing position.

A further object of the present invention is the provision of a device which is economical to manufacture, durable in use, and efficient in operation.

SUMMARY OF THE INVENTION

The present invention utilizes an elongated rod having a flexible cylindrical plug member mounted on one end thereof. Slidably mounted over the rod and engaging the flexible plug member is an elongated sleeve which is free to slide into engagement with the plug member.

In operation, the plug member is inserted into the upstream end of the water pipe which forms a part of the joint to be soldered. The rod is then pulled axially outwardly from the sleeve so that the plug member engages the sleeve and is axially compressed. This axial compression of the plug member causes it to expand radially outwardly and form a sealing engagement with the interior of the pipe to be closed off.

A special tool is utilized for pulling the rod axially through the sleeve. This tool comprises a pair of jaw members pivotally mounted with respect to one another in sizzors-like fashion. One of the jaw members is provided at one end with a yoke which is adapted to retentively engage a pair of slots at one end of the sleeve. The other jaw member includes a similar yoke which is adapted to engage a button threadably mounted on the end of the rod. By spreading the jaw members apart it is possible to move the rod axially with respect to the sleeve.

A lock button is also threadably mounted on the rod so that it can be threaded up against the sleeve after the plug member has been expanded so as to hold the plug member in its expanded position during the soldering operation.

After the soldering is complete, the rod is again moved axially through the sleeve so as to decompress the plug and thereby disengage its sealing engagement with the interior of the pipe. The rod and sleeve can then be easily removed from the pipe, and the soldering operation is complete.

BRIEF DESCRIPTION OF THE DRAWINGS

FIG. 1 is a perspective view of the valve inserted within a water pipe, and showing the water pipe in section.

FIG. 2 is a sectional view taken along line 2—2 of FIG. 1.

FIG. 3 is a longitudinal section of the valve of the present invention.

FIG. 4 is an exploded perspective view of the various components of the valve.

DETAILED DESCRIPTION OF THE PREFERRED EMBODIMENT

Referring to the drawings, the numeral 10 generally refers to the soldering valve and the numeral 12 generally refers to the tool for operating the soldering valve. Valve 10 is shown mounted within an elongated straight pipe 14 having an open end 16. A solder gate valve 18 is shown slidably fitted over the open end 16 of pipe 14 in conventional fashion.

In order to solder gate valve 18 to straight pipe 14 it is necessary to rid the point completely of water. Otherwise the solder will not provide a watertight seal. The tool of the present invention is used to prevent water from passing from the upstream end 20 of pipe 14.

Valve 10 is comprised of an elongated rod 20 having a forward threaded end 22 and a rearward threaded end 24. Threadably mounted over forward end 22 of rod 20 is a burled circular nut 26. Immediately rearwardly from nut 26 is a circular washer 28. Washer 28 abuts against a cylindrical flexible plug member 30 which has a forward axial end 32, a rearward axial end 34 and an outer cylindrical surface 36. Also extending through the axial center line of plug member 30 is a longitudinal bore 37 which permits the plug member 30 to slide longitudinally on rod 20. A second washer 38 is slidably mounted over rod 20 and engages the forward axial end 34 of plug member 30.

Plug member 30 is made of a flexible material such as rubber which is compressible in an axial direction. However, the axial compression of plug member 30 causes it to expand radially outwardly. The diameter of plug member 30 in its normal state is slightly less than the interior diameter of pipe 14. When plug member 30 is compressed axially, it expands radially outwardly to a diameter which is slightly greater than the interior diameter of pipe 14.

An elongated cylindrical sleeve 40 is slidably mounted over rod 20. Sleeve 40 includes a forward end 42 and a rearward end 44. Forward end 42 engages washer 38. Adjacent its rearward end 44, sleeve 40 is provided with a pair of slots 46. Threadably mounted on rod 20 are a pair of buttons 48, 50.

Tool 12 comprises a pair of elongated jaw members 52, 54. Jaw member 52 includes a handle portion 56 at one end and a Y-shaped yoke portion 58 at the other end. Similarly, jaw member 54 includes a handle portion 60 at one end and a Y-shaped yoke member 62 at the other end. Each yoke 58, 62 includes a pair of Y-arms 64; 66. Jaw members 52, 54 are pivoted at their approximate centers by means of a nut and bolt 68, 70. Manual squeezing of handles 60, 56 causes yokes 58, 62 to move apart from one another. The Y-arms 64, 66 of yoke 58 are sized to retentively fit within the slots 46 in sleeve 40 as shown in FIGS. 1 and 3. The Y-arms 64, 66 embrace rod 20 immediately forwardly of button 50. Thus, by squeezing handles 56, 60 it is possible to cause rod 20 to be drawn rearwardly (to the right as viewed in FIG. 3) from sleeve 40.

This rearward movement of rod 20 with respect to sleeve 40 causes the plug 30 to be exposed to axial compression between washer 28 and washer 38. The forward end 42 of sleeve 40 presses against sleeve 38 and the nut 26 at the end of rod 20 pushes in the opposite direction against washer 28. This causes the plug member 30 to be axially compressed and at the same time causes the plug member 30 to expand radially outwardly and engage the interior cylindrical wall of pipe 14 to form sealing engagement therewith.

Once a watertight seal is formed between plug member 30 and the interior of pipe 14, it is possible to rotate button 48 to cause it to move axially on rod 20 until it engages the rearward end 44 of sleeve 40. This locks the rod 20 and the sleeve 40 against movement with respect to one another and maintains the plug member 30 in its compressed state so that a watertight seal is formed on the interior of pipe 14.

With the plug member 30 sealed against the pipe 14, the residual water 72 is prevented from moving into the area designated generally 74. Area 74 is the area where the soldering is to be accomplished.

It should be noted also that plug 30 is at a point which is spaced a short distance from the soldering joint 74 so that when the soldering torch is applied to the joint 74 it will not cause damage to or melting of the plug member 30.

After the soldering is completed, tool 12 is removed and the button 48 is loosened so as to permit the plug member 30 to resume its original position. Then rod 24 can be removed from the pipe 14 to complete the operation.

Gate valve 18 can then be closed so as to prevent the residual water from interferring with additional soldering at the open end 76 of gate valve 18.

If it is not practical to use a solder gate valve such as shown in FIG. 1, a female thread adapter may be used instead. The adapter may be soldered in place in the same manner as shown for gate valve 18. After being soldered in place, the thread adapter may be closed off by threading a plug into its open end.

The mounting of the yokes 58, 62 on tool 12 to the rod 20 and the sleeve 40 is quick and easy so as to make the operation a simple one to perform. The device is simple in operation and economical to manufacture.

Thus, it can be seen that the device accomplishes at least all of its stated objectives.

What is claimed is:

1. A quick stop soldering valve for closing off an elongated pipe having an open end and an interior cylindrical pipe wall, said valve comprising:

an elongated rod having forward and rearward ends;

a cylindrical plug member made of flexible material mounted to said rod adjacent said forward end of said rod;

stop means attached to said forward end of said rod forwardly of said plug member for preventing said plug member from moving forwardly with respect to said rod;

a cylindrical sleeve having a forward end and a rearward end;

said rod extending through said sleeve with said rear end of said rod protruding rearwardly beyond said rear end of said sleeve, and with said forward end of said rod and said plug member protruding beyond said forward end of said sleeve;

said plug member having a diameter larger than said sleeve;

tool means for grasping said rear end of said rod and said rear end of said sleeve for pulling said rod rearwardly with respect to said sleeve whereby said plug member is compressed axially between said forward end of said sleeve and said stop means in response to this compression expands in diameter;

said plug member normally having a diameter slightly less than the diameter of said interior pipe wall and being capable of expanding to a diameter slightly greater than the diameter of said interior pipe wall in response to said axial compression between said forward end of said sleeve and said stop member.

2. A soldering valve according to claim 1 wherein a washer is mounted on said rod between said plug member and said forward end of said sleeve.

3. A soldering valve according to claim 1 wherein lock means are mounted on said rod for selectively holding said rod and said sleeve in a relative position which maintains said plug member in said axially compressed state.

4. A soldering valve according to claim 3 wherein said lock means comprises a lock button threadably mounted on said rod for threaded axial movement thereon, said button being sized to engage said rearward end of said sleeve and prevent forward movement of said rod with respect to said sleeve.

5. A soldering valve according to claim 1 wherein said tool means comprises a pair of jaw members pivotally connected to one another, one of said jaw members having first grasping means for grasping said sleeve and the other of said jaw members having second grasping means for grasping said sleeve.

6. A soldering valve according to claim 5 wherein said first and second grasping means are Y-shaped and include spaced apart Y-arms for retentively engaging said sleeve and rod respectively.

7. A soldering valve according to claim 6 wherein said sleeve includes a pair of slots therein for retentively receiving said Y-arms of said first grasping means.

8. A soldering valve according to claim 7 wherein a second button is threadably mounted on said rod for threaded axial movement thereon, said Y-arms of said second grasping means being adapted to engage said second button for causing the rearward movement of said rod with respect to said sleeve.

9. A method for using a quick stop soldering valve for closing off an elongated pipe having an open end and an interior cylindrical pipe wall, said valve comprising an elongated rod having forward and rear ends; a cylindrical plug member made of flexible material mounted to said rod adjacent said forward end of said rod; stop means attached to said rod forwardly of said plug member for preventing said plug member from moving forwardly with respect to said rod; a cylindrical sleeve having a forward end and a rearward end; said rod extending through said sleeve with said rear end of said rod protruding rearwardly beyond said rear end of said sleeve, and with said forward end of said rod and said plug member protruding beyond said forward end of said sleeve; said plug member having a diameter larger than said sleeve; tool means for grasping said rear end of said rod and said rear end of said sleeve for pulling said rod rearwardly with respect to said sleeve whereby said plug member is compressed axially between said forward end of said sleeve and said stop means and in response to this compression expands in diameter; said plug member normally having a diameter slightly less than the diameter of said interior pipe wall and being capable of expanding to a diameter slightly greater than the diameter of said interior pipe wall in response to said axial compression between said forward end of said sleeve and said stop member, said method comprising:

inserting said forward end of said rod having said plug member thereon into said pipe until said plug member is spaced forwardly from said open end of said pipe;

grasping said rear end of said sleeve and said rear end of said rod with said tool means;

moving said rear end of said rod rearwardly with respect to said sleeve until said plug member is compressed axially between said stop means and said forward end of said sleeve and expands in diameter to form a sealing engagement with the interior pipe wall.

10. A method according to claim 9 comprising locking said rod and said sleeve against movement with respect to one another after said plug member has formed a sealing engagement with said interior pipe wall.

* * * * *